United States Patent
Kim et al.

(10) Patent No.: US 8,395,572 B2
(45) Date of Patent: Mar. 12, 2013

(54) ELECTRONIC DISPLAY DEVICE

(75) Inventors: Beom-Shik Kim, Yongin (KR); Hui Nam, Yongin (KR); Chan-Young Park, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 423 days.

(21) Appl. No.: 12/656,051

(22) Filed: Jan. 14, 2010

(65) Prior Publication Data

US 2010/0182291 A1    Jul. 22, 2010

(30) Foreign Application Priority Data

Jan. 16, 2009   (KR) .................. 10-2009-0003837

(51) Int. Cl.
  *G09G 3/36*   (2006.01)
(52) U.S. Cl. .............. 345/87; 345/93; 349/143
(58) Field of Classification Search .......... 345/38, 345/41, 50–54, 60–64, 87–104; 349/8–16, 349/57–66, 74–87, 96–103, 122–136, 147, 349/151, 179–181
See application file for complete search history.

(56) References Cited

U.S. PATENT DOCUMENTS

| 7,612,833 | B2 | 11/2009 | Kim |
| 2006/0146208 | A1* | 7/2006 | Kim ........................... 349/15 |
| 2006/0232719 | A1* | 10/2006 | Abileah ..................... 349/15 |
| 2008/0030634 | A1* | 2/2008 | Aramatsu .................. 349/15 |
| 2008/0218459 | A1 | 9/2008 | Kim et al. |
| 2009/0225243 | A1 | 9/2009 | Kim et al. |

FOREIGN PATENT DOCUMENTS

KR   10 2006-0078051 A   7/2006

\* cited by examiner

*Primary Examiner* — Amare Mengistu
*Assistant Examiner* — Vinh Lam
(74) *Attorney, Agent, or Firm* — Lee & Morse, P.C.

(57) ABSTRACT

An electronic display device includes a display unit that displays images and a barrier unit between the display unit and a user, and provides images to the user as two-dimensional images or stereoscopic images. The barrier unit includes first electrodes on a first surface, the first electrodes being spaced apart from each other, second electrodes on the first surface, at a first gap from the first electrodes and between the first electrodes, auxiliary electrodes on a second surface, corresponding to the first gap, the auxiliary electrodes configured to be driven in synchronization with any one of the two-dimensional images and the stereoscopic images, a common electrode on a third surface, and a liquid crystal layer between the common electrode and first, second, and auxiliary electrode. A barrier driver controls the barrier unit in accordance with whether two-dimensional images or stereoscopic images are to be displayed.

20 Claims, 12 Drawing Sheets

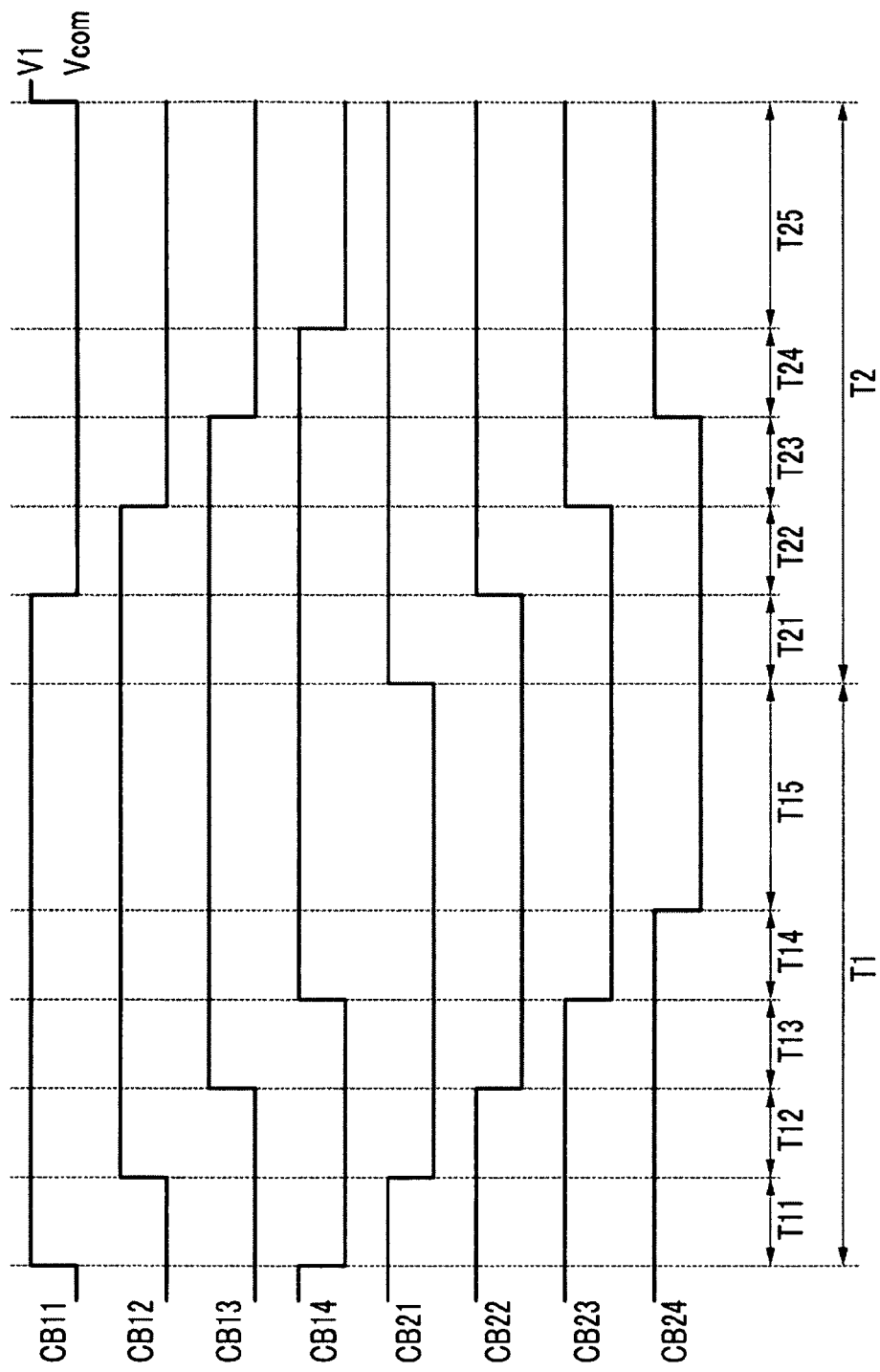

ELECTRONIC DISPLAY DEVICE

BACKGROUND

1. Field

Embodiments relate to an electronic display device and, more particularly, to an electronic image device capable of displaying stereoscopic images.

2. Description of the Related Art

An electronic image device displaying stereoscopic images is a device that provides different images to an observer's left eye and right eye, such that the observer perceives a stereoscopic effect about viewed images. Among such electronic display devices, autostereoscopy devices allow an observer to view stereoscopic images without putting on a device, e.g., polarizing spectacles using binocular parallax.

The general autostereoscopy device includes a display unit that divides a pixel into a pixel for the left eye and a pixel for the right eye and displays a left-eye image and a right-eye image, and a barrier unit located in front of the display unit that divides the left-eye image and the right-eye image implemented on the display unit in a left-eye direction and a right-eye direction with respect to the observer. The barrier unit may be a liquid crystal panel including transparent electrodes and liquid crystal layers, and may optically form a light shielding unit and a light transmitting unit according to electrical signals applied to the transparent electrodes.

When the pixels located along a horizontal direction on a screen are divided into odd-numbered pixels and even-numbered pixels in the display unit, the display unit divides one frame into two periods by a known time-division scheme and displays the left-eye images and the right-eye images in the odd-numbered pixels and the even-numbered pixels, respectively, during a first period, and the right-eye images and the left-eye images in the odd-numbered pixels and the even-numbered pixels, respectively, during a second period. Further, the barrier unit is synchronized with driving of the display unit to change the position of the light shielding unit and the light transmitting unit for the first period and the second period.

The barrier unit includes a common electrode, alternating first and second electrodes, and a liquid crystal layer between the common electrode and the first and second electrodes. When a common voltage is applied to the common electrode and a liquid crystal driving voltage is applied to the first electrodes, a region where the first electrodes are located in the barrier unit becomes the light shielding unit. When a common voltage is applied to the common electrode and the liquid crystal driving voltage is applied to the second electrodes, a region where the second electrodes are located in the barrier unit becomes the light shielding unit.

In the above-mentioned time-division driving scheme, the observer can view all the pixels on the display unit, i.e., the odd-numbered pixels and the even-numbered pixels, such that the observer can view stereoscopic images having the same resolution as two-dimensional images. However, in the barrier unit, in order to prevent a short circuit between the first electrodes and the second electrodes, they are separated by a predetermined gap from each other, such that light emitted from the display unit leaks through the gap between the first electrodes and the second electrodes during operation of the barrier unit.

Therefore, there is a problem in that the electronic display device in the related art increases crosstalk to degrade the image quality of the stereoscopic image and the contrast of the screen.

The above information disclosed in this Background section is only for enhancement of understanding of the background of the invention and therefore it may contain information that does not form the prior art that is already known in this country to a person of ordinary skill in the art.

SUMMARY

Embodiments are therefore directed to an electronic display device including a display unit that displays images and a barrier unit that is arranged to be opposite to the display unit and displays two-dimensional images or stereoscopic images, which substantially overcome one or more of the problems due to the limitations and disadvantages of the related art.

It is therefore a feature of an embodiment to provide an electronic display device including a display unit and a barrier unit that decreases crosstalk when displaying stereoscopic images.

It is therefore another feature of an embodiment to provide an electronic display device including a display unit and a barrier unit that provides a high luminance two-dimensional image.

At least one of the above and other features and advantages may be realized by providing an electronic display device including a display unit that displays images, a barrier unit, between the display unit and a viewer, the barrier unit configured to provide images to a user as two-dimensional images or stereoscopic images, and a barrier driver configured to control the barrier unit in accordance with whether two-dimensional images or stereoscopic images are to be displayed. The barrier unit may include first electrodes on a first surface, the first electrodes being spaced apart from each other, second electrodes on the first surface, at a first gap from the first electrodes and between the first electrodes, auxiliary electrodes on a second surface, corresponding to the first gap, the auxiliary electrodes configured to be driven in synchronization with any one of the two-dimensional images and the stereoscopic images, a common electrode on a third surface, and a liquid crystal layer between the common electrode and first, second, and auxiliary electrode.

The second surface may be a transparent insulation layer covering the first electrodes and the second electrodes, and the auxiliary electrodes are on the transparent insulation layer. The barrier unit may include a first alignment layer on the transparent insulation layer and covering the auxiliary electrodes, and a second alignment layer on the common electrode.

The first surface may be a transparent insulating layer covering the auxiliary electrodes, and the first and second electrodes may be on the transparent insulating layer. The barrier unit may include a first alignment layer on the transparent insulation layer and covering the first electrodes and the second electrodes, and a second alignment layer on the common electrode.

A width of each of the auxiliary electrodes may be larger than the first gap.

The barrier unit may include a first connecting part that electrically connects the first electrodes, a second connecting part that electrically connects the second electrodes, and a third connecting part that electrically connects the auxiliary electrodes.

The barrier unit may include a first polarizing plate below the first and second surfaces, and a second polarizing plate above the third surface, the polarizing axes of the first and second polarizing plates being orthogonal.

When the display unit displays the two-dimensional images, the barrier driver may supply a common voltage to the first electrodes, the second electrodes, the auxiliary electrodes, and the common electrode.

When the display unit displays stereoscopic images, the display unit may be configured to divide one frame into a first period and a second period, and display first images for the first period and second images for the second period. The barrier driver may be configured to apply a liquid crystal driving voltage to the first electrodes and the auxiliary electrodes during the first period, and apply the liquid crystal driving voltage to the second electrodes and the auxiliary electrodes during the second period.

The display unit may include a plurality of scan lines that transfer a plurality of selection signals, a plurality of data lines that transfer a plurality of data signals, and a plurality of pixels connected to the scan lines and the data lines, the barrier unit including a plurality of regions divided along a scan direction of the display unit, first and second electrodes being provided to each of the plurality of regions.

The display unit may be configured to divide one frame into a first period and a second period, and display first images for the first period and second images for the second period by driving the first electrodes in accordance with the first images and the second electrodes in accordance with the second images. The barrier driver may be configured to control a region, among the plurality of regions, corresponding to a mixing region where the first images and the second images are mixed to be a non-transmitting region. The first images may be displayed along a scan direction for the first period and the second images maybe displayed along a scan direction for the second period, and the mixing region is a region where the first image and the second image are mixed while displaying the first image and then the second image.

The first images may be generated by synthesizing the left-eye images and the right-eye images according to an order from the left eye to the right eye. The second images may be generated by synthesizing the left-eye images and the right-eye images according to an order from the right eye to the left eye.

The barrier driver may be configured to apply the liquid crystal driving voltage to the auxiliary electrodes during the first and second periods.

BRIEF DESCRIPTION OF THE DRAWINGS

The above and other features and advantages will become more apparent to those of ordinary skill in the art by describing in exemplary embodiments with reference to the attached drawings, in which:

FIG. 16 illustrates a diagram of barrier driving signals transferred from a barrier driving unit to a plurality of wire units in the electronic display device according to the third exemplary embodiment.

DETAILED DESCRIPTION

Figure 1:
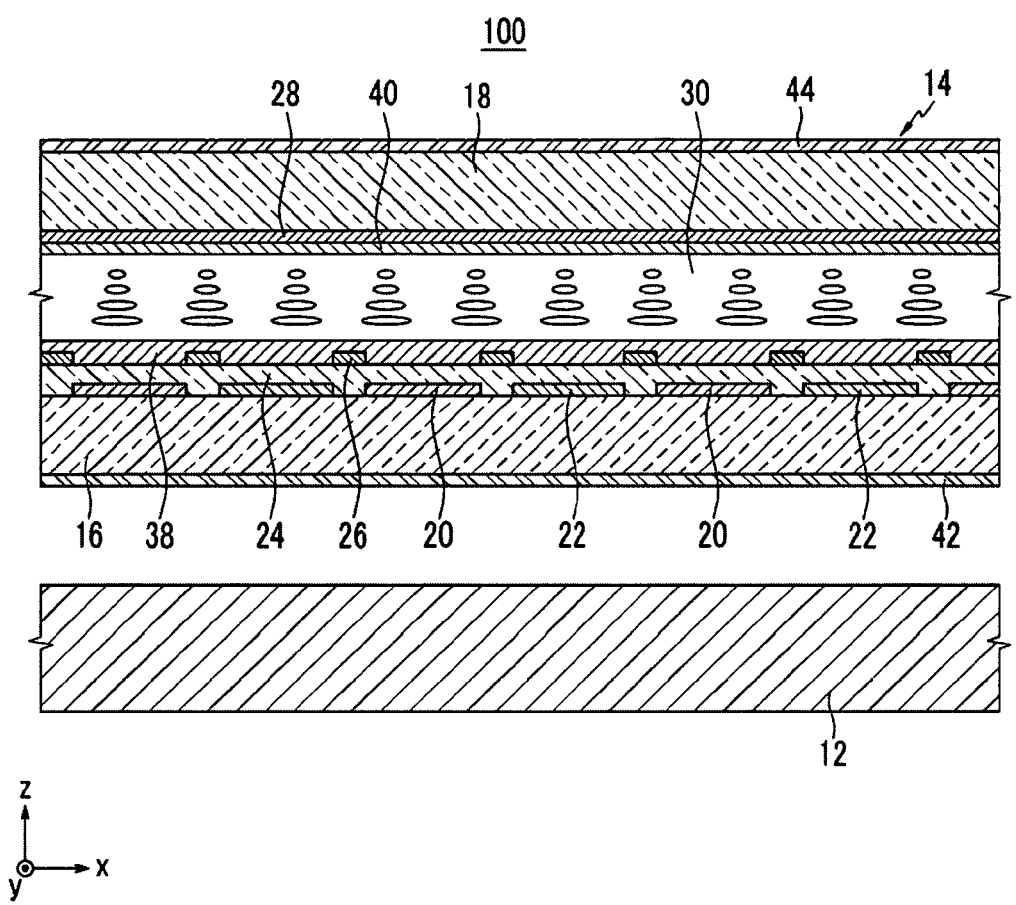
FIG. 1 illustrates a partial cross-sectional view of an electronic display device according to a first exemplary embodiment.

Korean Patent Application No. 10-2009-0003837, filed on Jan. 16, 2009, in the Korean Intellectual Property Office, and entitled: "Electronic Display Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a partial cross-sectional view of an electronic display device according to a first exemplary embodiment. Referring to FIG. 1, an electronic display device 100 may include a display unit 12 that displays images and a barrier unit 14 located in front of the display unit 12.

The display unit 12 may include a plurality of pixels each of which includes sub-pixels of red, green, and blue. The display unit 12 applies two-dimensional image signals to all the pixels, thereby making it possible to display the two-dimensional images. On the other hand, the display unit 12 is separately applied with left-eye image signals and right-eye image signals per each pixel or sub-pixel, thereby making it possible to separately display the left-eye images and the right-eye images.

The control of the image signal may be performed through an image signal controlling unit (not shown).

Any display device, e.g., a liquid crystal display device, an organic light emitting display device, a plasma display panel, a cathode ray tube, etc., may be used as the display unit 12.

The barrier unit 14 may be a liquid crystal panel including a liquid crystal layer and transparent electrodes. The barrier unit 14 may form a light shielding unit and a light transmitting unit according to electrical signals applied to the transparent electrodes.

Figure 2:
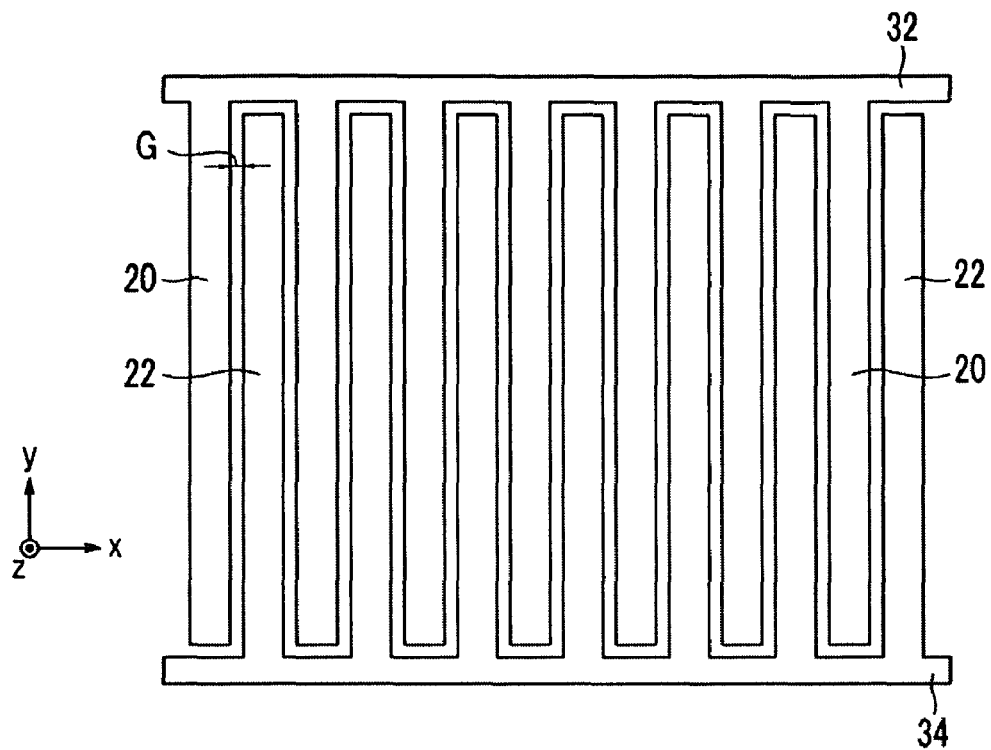
FIG. 2 illustrates a top plan view of first electrodes and second electrodes in a configuration of a barrier unit shown in FIG. 1.
Figure 3:
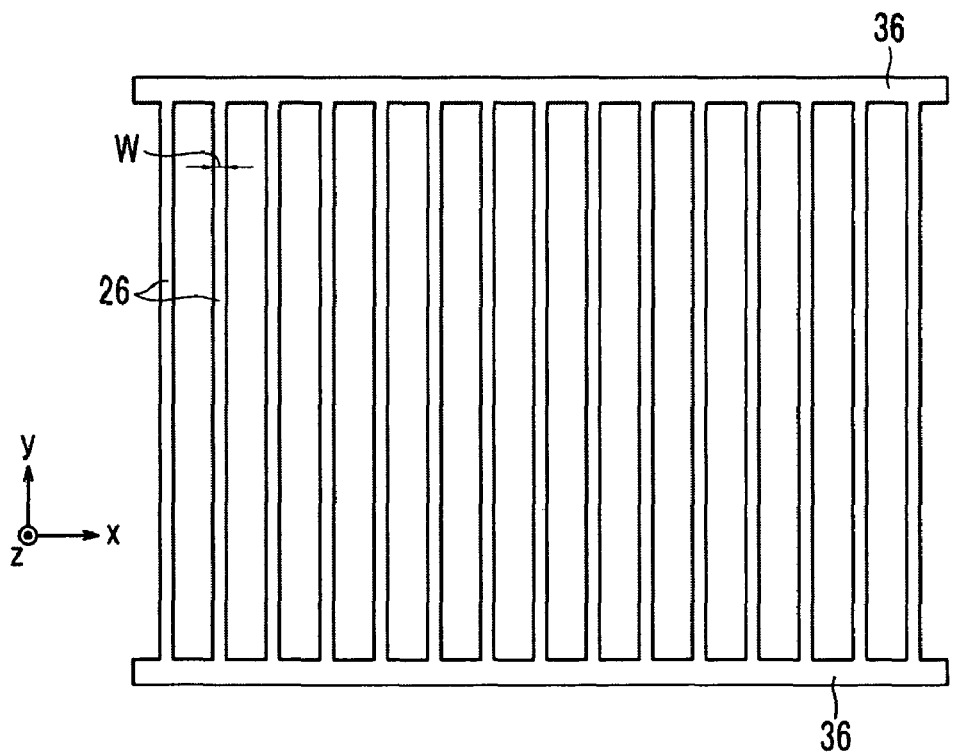
FIG. 3 illustrates a top plan view of auxiliary electrodes in a configuration of the barrier unit shown in FIG. 1.

FIG. 2 illustrates a top plan view of first electrodes and second electrodes in a configuration of the barrier unit 14 of FIG. 1 according to an embodiment. FIG. 3 illustrates a top plan view of auxiliary electrodes in a configuration of the barrier unit 14 of FIG. 1 according to an embodiment.

Referring to FIGS. 1 to 3, the barrier unit 14 may include a first substrate 16 and a second substrate 18 arranged to be opposite to each other at a predetermined distance, first electrodes 20 and second electrodes 22 inside the first substrate 16, auxiliary electrodes 26 located at the first electrodes 20 and the second electrodes 22 with transparent insulation layers 24 and other layers therebetween, a common electrode 28 inside the second substrate 18, and a liquid crystal layer 30 located between the first substrate 16 and the second substrate 18.

The first electrodes 20 and the second electrodes 22 may be formed in a stripe shape having a long side along a vertical direction (y-axis direction in the drawings) of the display unit 12.

The first electrodes 20 may be parallel and spaced at a distance from each other along a horizontal direction (X-axis direction in the drawings) of the display unit 12. The second electrodes 22 between the first electrodes 20 may be located in parallel with the first electrodes 20. The first electrodes 20 and the second electrodes 22 may be separated from each other by a first gap (G, see FIG. 2) therebetween to prevent an electrical short circuit therebetween.

A first connection unit 32 may be located at one end, e.g., an upper end as illustrated in FIG. 2, of the first electrodes 20, thereby electrically connecting the first electrodes 20. A second connection unit 34 may be located at one end, e.g., a lower end as illustrated in FIG. 2, of the second electrodes 22, thereby electrically connecting the second electrodes 22.

The auxiliary electrodes 26 may be located on the transparent insulation layers 24, corresponding to the first gap G. In other words, each auxiliary electrode 26 may be located corresponding to a portion between the first electrode 20 and the second electrode 22 along a thickness direction (z-axis in the drawings) of the barrier unit 14. A width W of the auxiliary electrode 26 may be formed to be equal to or larger than the first gap G. As one example, FIG. 1 shows a case where the auxiliary electrode 26 is formed with the same width W as the first gap G.

The auxiliary electrodes 26 may be isolated from the first electrodes 20 and the second electrodes 22 by the transparent insulation layers 24. The auxiliary electrodes 26 may also be formed in a stripe shape having a long side along a vertical direction (y-axis direction in the drawings) of the display unit 12.

A third connection unit 36 is located at one end or both ends of the auxiliary electrodes 26 to electrically connect the auxiliary electrodes 26. As one example, FIG. 3 shows a case where a third connection unit 36 is located at both ends of the auxiliary electrodes 26.

The common electrode 28, as seen in FIG. 1, may be formed at the entire effective region of the second substrate 18.

The first electrodes 20, the second electrodes 22, the auxiliary electrodes 26, and the common electrode 28 are formed of a transparent conductive layer, e.g., indium tin oxide (ITO) or indium zinc oxide (IZO).

Referring again to FIG. 1, the barrier unit 14 may further include a first alignment layer 38 on a transparent insulation layer 24 while covering auxiliary electrodes 26, a second alignment layer 40 on the common electrode 28, a first polarizing plate 42 on an outer surface of the first substrate 16, and a second polarizing plate 44 on an outer surface of the second substrate 18.

The first alignment layer 38 and the second alignment layer 40 perform a role of arranging a liquid crystal material forming the liquid crystal layer 30 in a specific state. The liquid crystal layer 30 may be formed of a twisted nematic (TN) type of liquid crystal having a twist angle of 90° in a state where a voltage is not applied. The first polarizing plate 42 and the second polarizing plate 44, which are linear polarizing plates, are arranged so that their polarizing axes are orthogonal to each other.

Figure 4:
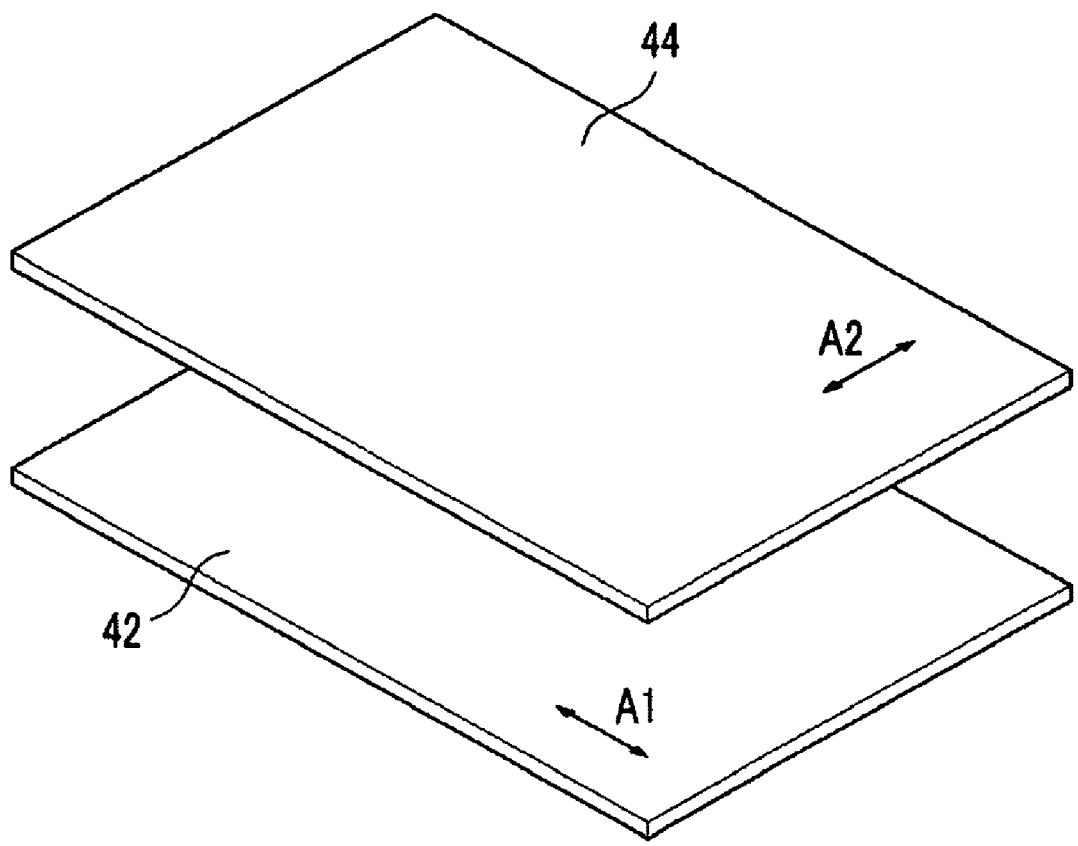
FIG. 4 illustrates a perspective view of a first polarizing plate and a second polarizing plate in a configuration of a barrier unit shown in FIG. 1.

FIG. 4 illustrates a perspective view of the first polarizing plate 42 and the second polarizing plate 44 shown in FIG. 1. In FIG. 4, the polarizing axis of the first polarizing plate 42 is represented by an arrow A1 and the polarizing axis of the second polarizing plate 44 is represented by an arrow A2.

The barrier unit 14 having the above-mentioned structure may control a voltage applied to the first electrodes 20, the second electrodes 22, the auxiliary electrodes 26, and the common electrode 28 to control light transmission for each position.

Hereinafter, a process where the electronic display device 100 displays two-dimensional images and stereoscopic images will be described.

First, in order for the electronic display device 100 to display two-dimensional images, the two-dimensional images are applied to all the pixels included in the display unit 12, such that the display unit 12 displays the two-dimensional images. At this time, the liquid crystal driving voltage is not applied to the first electrodes 20, the second electrodes 22, the auxiliary electrodes 26, and the common electrode 28, all of which are included in the barrier unit 14, such that the barrier unit 14 becomes a transmitting type over the entire region.

In the present exemplary embodiment, since the liquid crystal layer 30 is formed of the TN type of liquid crystal and the polarizing axis (A1, see FIG. 4) of the first polarizing plate 42 and the polarizing axis (A2, see FIG. 4) of the second polarizing plate 44 are orthogonal to each other, light that is linearly polarized in the A1 direction by the first polarizing plate 42 is transmitted through the second polarizing plate 44 in a state where the polarizing axis of the light is twisted by 90°, after passing through the liquid crystal layer 30.

Therefore, when a voltage is not applied, an entirety of the barrier unit 14 becomes transmitting, which is referred to as a normally white mode. The barrier unit 14 configured in the normally white mode has an effect of lowering power consumption when the electronic display device 100 mainly displays two-dimensional images rather than stereoscopic images.

Next, in order for the electronic display device 100 to display the stereoscopic image (or three-dimensional image), left-eye image signals and right-eye image signals per pixel or sub-pixel, may separately be applied to the display unit 12, such that the left-eye images and the right-eye images are separately displayed to produce stereoscopic images. Further, the liquid crystal driving voltage is sequentially applied to the first electrodes 20 or the second electrodes 22 and the auxiliary electrodes 26 in the barrier unit 14 to optically form the light shielding unit and the light transmitting unit.

Figure 5:
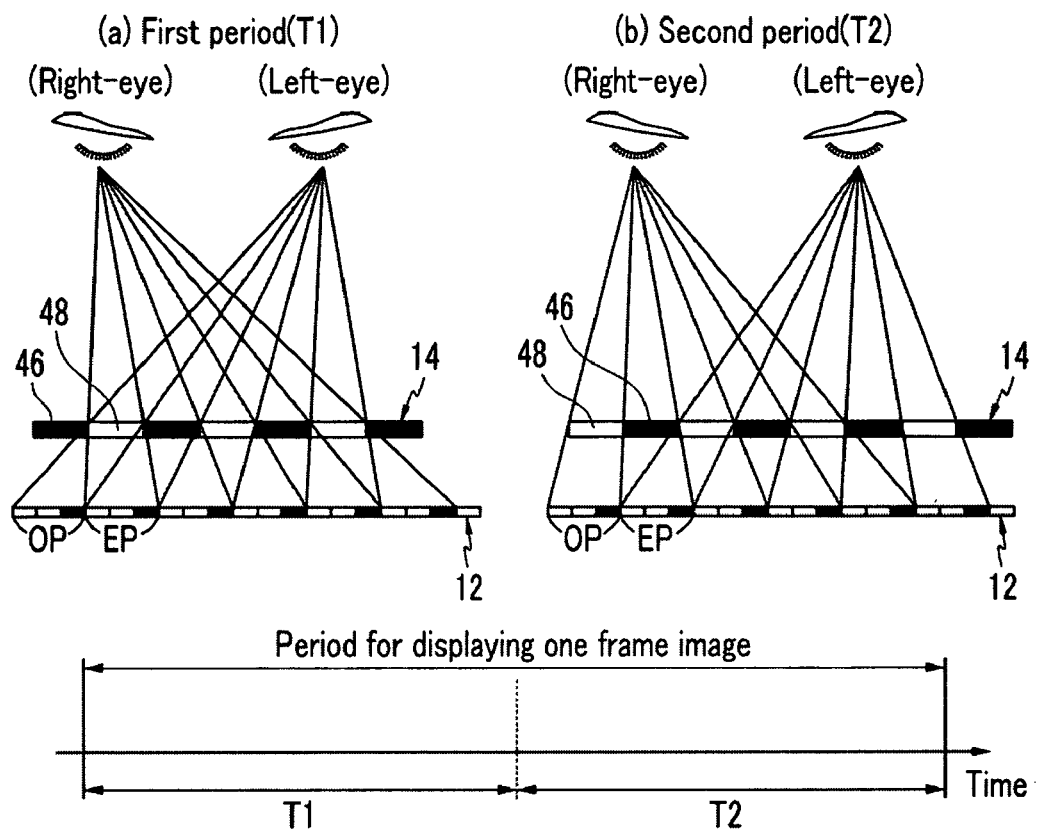
FIG. 5 illustrates a schematic diagram of a time-division driving scheme of the electronic display device according to the first exemplary embodiment.

FIG. 5 illustrates a schematic diagram showing a time-division driving scheme of the electronic display device 100 of the present exemplary embodiment when stereoscopic images are generated by a time-division scheme in which a frame may be divided into periods, e.g., a first period T1 and a second period T2. FIG. 5 (a) illustrates a diagram showing one set of displaying images (first images) that are synthesized in an order of left eye-right eye-left eye-right eye along a horizontal direction of the display unit 12 for the first period T1. FIG. 5 (b) illustrates a diagram showing one set of displaying images (second images) that are synthesized in an order of right eye-left eye-right eye-left eye along a horizontal direction of the display unit 12 for the second period T2.

Referring to FIG. 5 (a), odd-numbered pixels (OP) (or sub-pixels) of the display unit 12 become pixels (or sub-pixels) for the left eye for the first period T1 and even-numbered pixels (EP) (or sub-pixels) become pixels for the right eye. Further, the barrier unit 14 alternately and repeatedly forms a light shielding unit 46 and a light transmitting unit 48 along the horizontal direction of the display unit 12 one by one. At this time, a path projecting the left-eye images and the right-eye images in the observer's left eye and right eye directions is formed.

Referring to FIG. 5 (b), odd-numbered pixels (OP) (or sub-pixels) of the display unit 12 become pixels (or sub-pixels) for the right eye for the second period T2 and even-numbered pixels (EP) (or sub-pixels) become pixels (or sub-pixels) for the left eye. In addition, the barrier unit 14 alternately and repeatedly forms the light transmitting unit 48 and the light shielding unit 46 along the horizontal direction of the display unit 12 one by one.

At this time, a path projecting the right-eye images and the left-eye images, respectively, in the observer's right eye and left eye directions is formed. As such, the left-eye image and the right-eye image that are separated by the barrier unit 14 have a predetermined disparity from each other, and the observer observing the electronic display device 100 obtains depth information like viewing actual stereoscopic objects to perceive the stereoscopic effect. Further, since one frame is displayed by being divided into the first period T1 and the second period T2, the observer views all the pixels of the display unit 12, such that the observer can view the stereoscopic images having the same resolution as the two-dimensional images.

Figure 6:
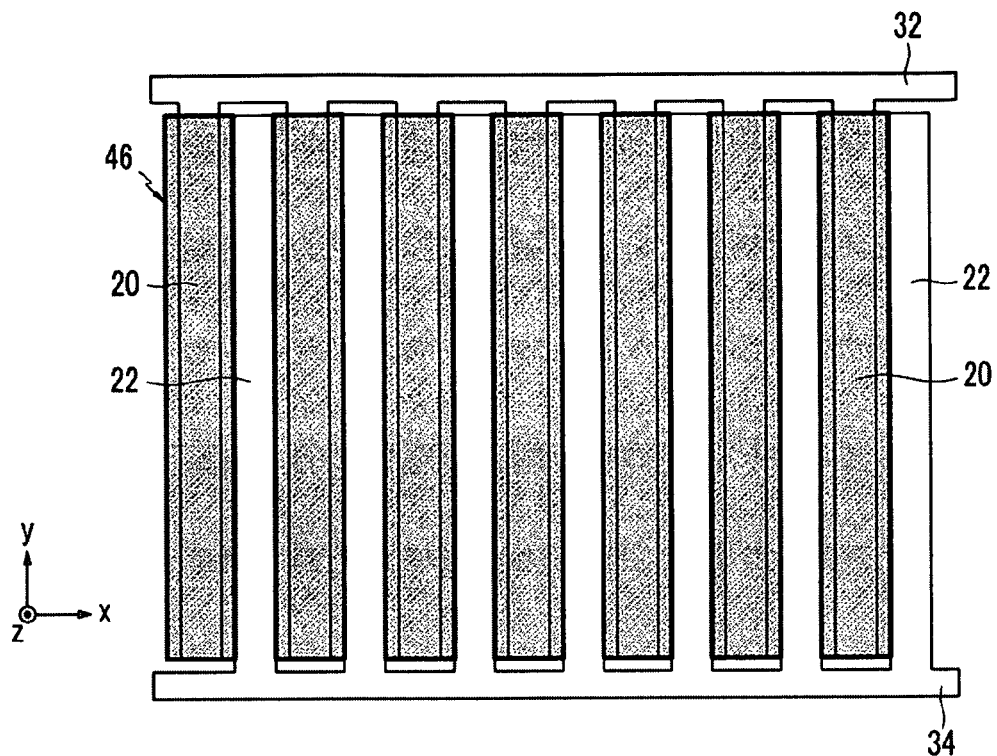
FIG. 6 illustrates a schematic top plan view of an operating state of the barrier unit for the first period shown in FIG. 5.
Figure 7:
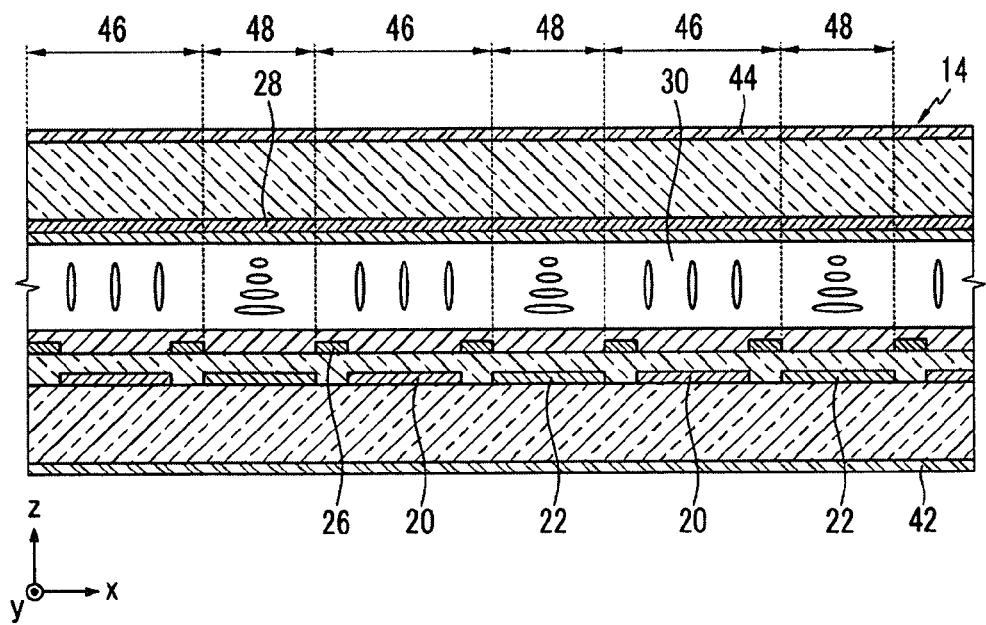
FIG. 7 illustrates a partial cross-sectional view of the barrier unit of an operating state of the barrier unit for the first period shown in FIG. 5.

FIGS. 6 and 7 illustrate a principle of the barrier unit 14 optically forming the light shielding unit 46 and the light transmitting unit 48 for the first period T1. Referring to FIGS. 6 and 7, the common voltage (for example, 0V) is applied to the common electrode 28, the liquid crystal driving voltage is applied to the first electrodes 20 and the auxiliary electrodes 26, and the second electrodes 22 receive the common voltage or are floated.

At this time, the liquid crystals are vertically aligned along the thickness direction of the barrier unit 14 (z-axis direction of FIG. 7) in a region where the first electrodes 20 and the auxiliary electrodes 26 are located due to the voltage difference between the common electrode 28 and the first electrodes 20 and the voltage difference between the common electrode 28 and the auxiliary electrodes 26. Therefore, in the region where the first electrodes 20 and the auxiliary electrodes 26 are located, light that is linearly polarized in the A1 direction (see FIG. 4) by the first polarizing plate 42 is not transmitted by the second polarizing plate 44. In other words, the polarizing axis of light that is linearly polarized in the A1 direction is maintained while passing through the liquid crystal layer 30, and is subsequently blocked by the second polarizing plate 44.

As a result, the region where the first electrodes 20 and the auxiliary electrodes 26 are located in the middle of the barrier unit 14 optically becomes the light shielding unit 46. The remaining region, i.e., the region where the second electrodes 22 are located, becomes the light transmitting unit 48.

Figure 8:
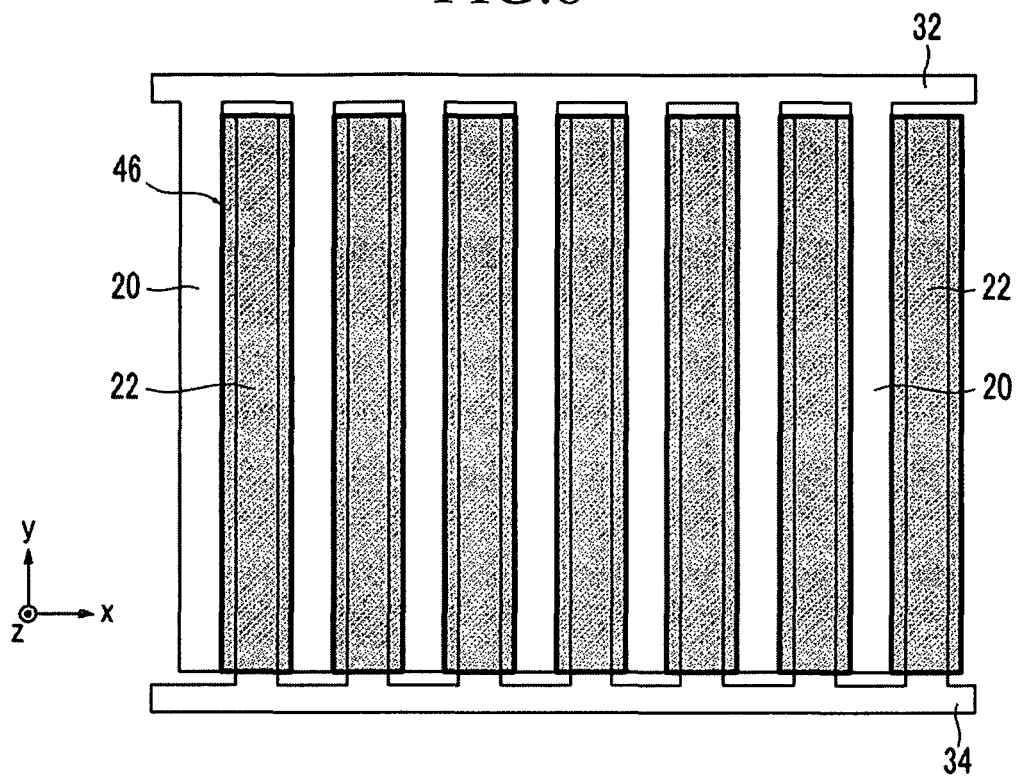
FIG. 8 illustrates a schematic top plan view of an operating state of the barrier unit for the second period shown in FIG. 5.
Figure 9:
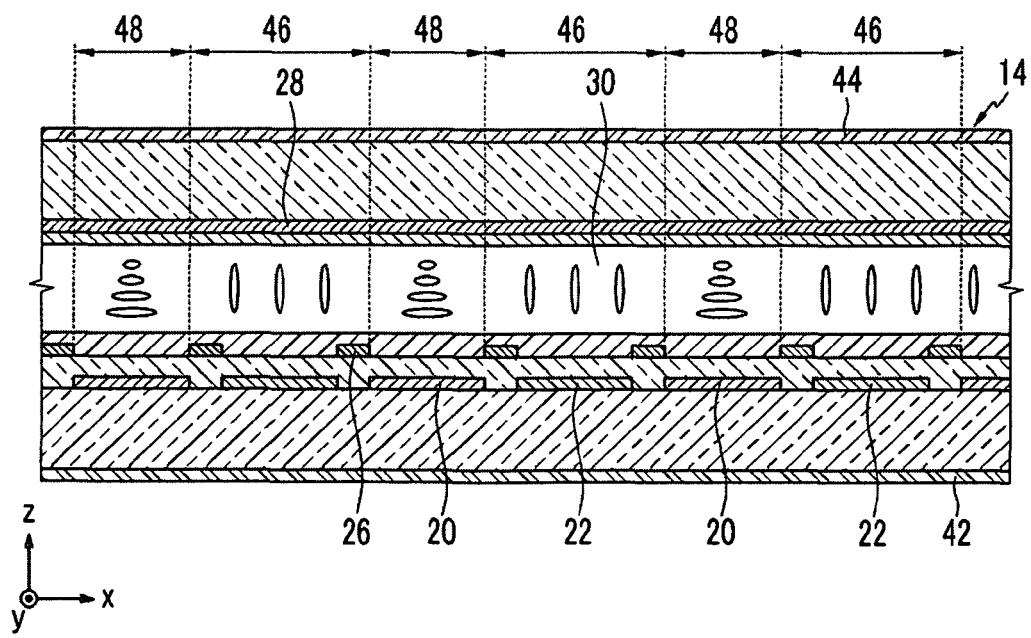
FIG. 9 illustrates a partial cross-sectional view of the barrier unit of an operating state of the barrier unit for the second period shown in FIG. 5.

Next, FIGS. 8 and 9 show a principle of the barrier unit 14 optically forming the light shielding unit 46 and the light transmitting unit 48 for the second period T2. Referring to FIGS. 8 and 9, the common voltage is applied to the common electrode 28, the liquid crystal driving voltage is applied to the second electrodes 22 and the auxiliary electrodes 26, and the first electrodes 20 receive the common voltage or are floated.

At this time, the liquid crystals are vertically aligned along the thickness direction of the barrier unit 14 (z-axis direction of FIG. 9) in a region where the second electrodes 22 and the auxiliary electrodes 26 are located due to the voltage difference between the common electrode 28 and the second electrodes 22 and the voltage difference between the common electrode 28 and the auxiliary electrodes 26. Therefore, in the region where the second electrodes 22 and the auxiliary electrodes 26 are located, light that is linearly polarized in the A1 direction (see FIG. 4) by the first polarizing plate 42 is not transmitted by the second polarizing plate 44. In other words, the polarizing axis of light that is linearly polarized in the A1 direction is maintained while passing through the liquid crystal layer 30, and is subsequently blocked by the second polarizing plate 44.

As a result, the region where the second electrodes 22 and the auxiliary electrodes 26 are located in the middle of the barrier unit 14 optically becomes the light shielding unit 46. The remaining region, i.e., the region where the first electrodes 20 are located, becomes the light transmitting unit 48.

As described above, the liquid crystal driving voltage is applied to the auxiliary electrodes 26 for both the first period T1 and the second period T2 to optically form the light shielding unit 46. In other words, the auxiliary electrodes 26 serve as a black layer upon implementing the stereoscopic images. Therefore, when displaying the stereoscopic images, the auxiliary electrodes 26 serving as the black layer effectively suppress the leakage of light due to the gap G between the first electrodes 20 and the second electrodes 22.

On the other hand, when implementing the two-dimensional images, the auxiliary electrodes 26 do not receive the liquid crystal driving voltage. Therefore, the auxiliary electrodes 26 are transparent and the luminance of the two-dimensional images is not deteriorated.

As such, the electronic display device 100 according to the present exemplary embodiment prevents light from leaking from the barrier unit 14, such crosstalk may be suppressed when displaying stereoscopic images. As a result, the electronic display device can increase the image quality of the stereoscopic images and the contrast of the screen. Further, an aperture ratio of the auxiliary electrodes 26 of the electronic display device 100 according to the present exemplary embodiment may be about 50% or less, which results in improving the image quality of the stereoscopic images. In addition, when displaying two-dimensional images, the electronic display device according to embodiments does not cause luminance deterioration of the screen.

Figure 10:
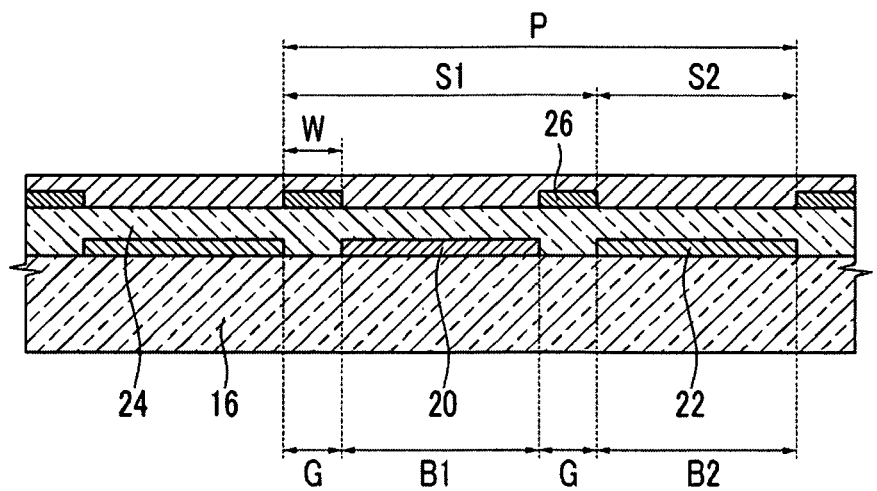
FIG. 10 illustrates a partial enlarged view of the barrier unit shown in FIG. 1

FIG. 10 illustrates a partial enlarged view of the barrier unit shown in FIG. 1 in accordance with an embodiment. Referring to FIG. 10, a width B1 of the first electrode 20 and a width B2 of the second electrode 22 may be identical. The first gap G between the first electrode 20 and the second electrode 22 may be equal to a width W of the auxiliary electrode 26.

Since the region where the first electrode 20 and the auxiliary electrode 26 are located serves as the light shielding unit 46 for the first period T1, the width S1 of the light shielding unit 46 may be represented by (B1+2G). Since the region where the second electrode 22 is located serves as the light transmitting unit 48, a width S2 of the light transmitting unit 48 may be identical to B2. Since B1 is identical to B2, the widths of the light shielding unit and the light transmitting unit, which are implemented during the second period T2, may be defined by S1 and S2.

In the present exemplary embodiment, since the width S1 of the light shielding unit 46 is formed to be larger than the width S2 of the light emitting unit, the aperture ratio of the barrier unit 14, which is calculated by S2/P (a ratio of width of the light transmitting unit 48 to pitch), becomes 50% or less. When the width W of the auxiliary electrode 26 is larger than the first gap G, the aperture ratio of the barrier unit 14 can be further reduced.

Figure 11:
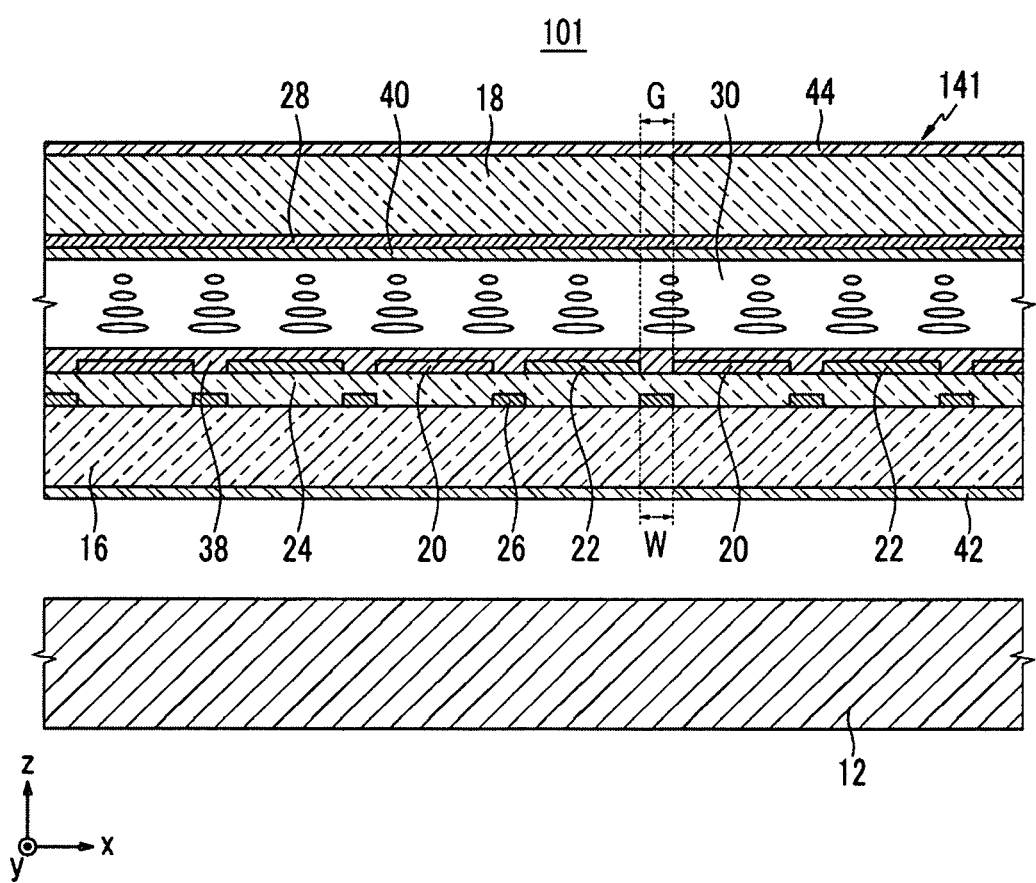
FIG. 11 illustrates a partial cross-sectional view of an electronic display device according to a second exemplary embodiment.

FIG. 11 illustrates a partial cross-sectional view of an electronic display device 101 according to a second exemplary embodiment. The electronic display device 101 may have the same configuration as the electronic display device 100 according to the above-mentioned first exemplary embodiment, other than a structure where the auxiliary electrodes 26 are arranged between the first substrate 16 and the first and second electrodes 20 and 22 in a barrier unit 141. The same reference numerals refer to the same members as in the first exemplary embodiment.

The first electrodes 20 and the second electrodes 22 may be on the transparent insulation layer 24 covering the auxiliary electrodes 26 and may be covered with the first alignment layer 38. The width W of the auxiliary electrodes 26 may be equal to, as illustrated in FIG. 11, or larger than the first gap G between the first electrodes 20 and the second electrodes 22.

Figure 12:
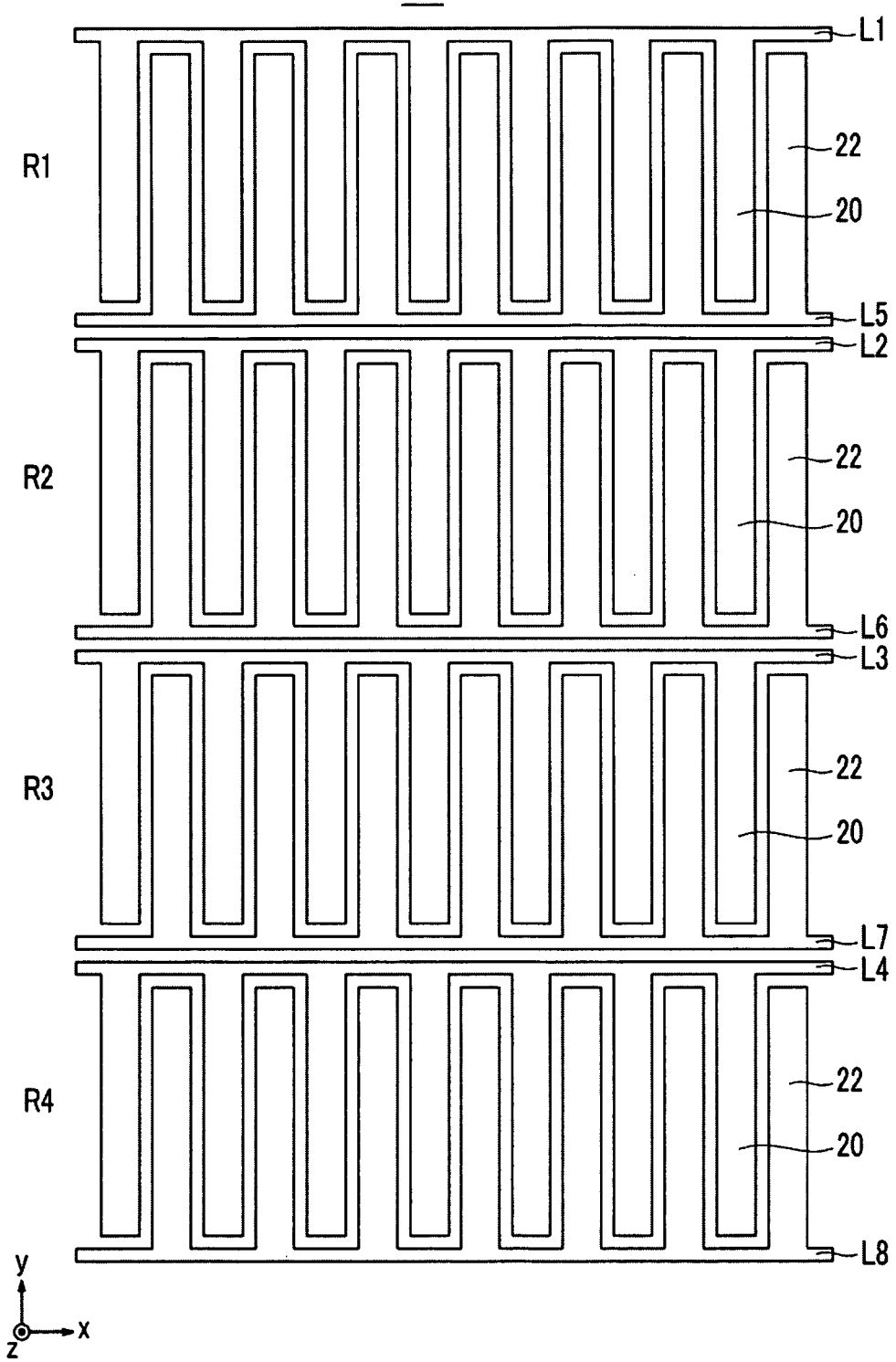
FIG. 12 illustrates a top plan view of first electrodes and second electrodes of a barrier unit among electronic display devices according to a third exemplary embodiment.

FIG. 12 illustrates a top plan view of first electrodes 20 and second electrodes 22 of a barrier unit 142 of electronic display devices according to a third exemplary embodiment. Referring to FIG. 12, the electronic display device according to the present exemplary embodiment has the same configuration as the electronic display device according to any one of the above-mentioned first and second exemplary embodiments, other than a structure where the barrier unit 142 is divided into a plurality of regions R1 to R4 along a scan direction (y-axis direction of FIG. 12) of the display unit. First electrodes 20 and second electrodes 22 are separately provided in each of the plurality of regions R1 to R4. The same reference numerals refer to the same members as in the first exemplary embodiment.

For convenience of explanation, the connection units of the first electrodes 20, which are located in 1/4 to 4/4 regions R1 to R4, are called a first wire unit L1, a second wire unit L2, a third wire unit L3, and a fourth wire unit L4. Further, the connection units of the second electrodes 22, which are located in 1/4 to 4/4 areas R1 to R4, are called a fifth wire unit L5, a sixth wire unit L6, a seventh wire unit L7, and an eighth wire unit L8.

Figure 13:
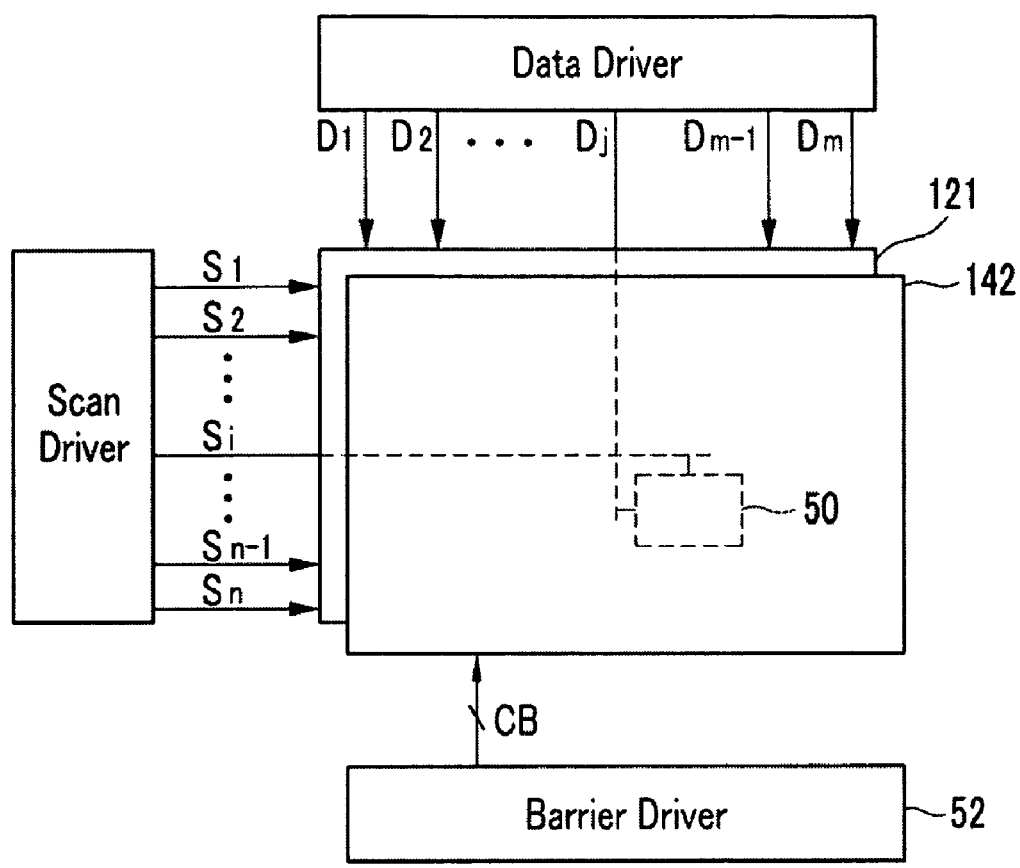
FIG. 13 illustrates a schematic diagram of an electronic display device according to a third exemplary embodiment.

FIG. 13 illustrates a schematic view of an electronic display device according to the third exemplary embodiment. Referring to FIG. 13, in the present exemplary embodiment, a display unit 121 may include a plurality of scan lines S1 to Sn that transfer the selection signals and a plurality of data lines D1 to Dm that are formed to intersect the scan lines S1 to Sn while maintaining insulation from the scan lines S1 to Sn and transfer data signals. Each sub-pixel 50 is located at an intersecting region of the scan lines and the data lines.

The barrier unit 142 may be connected with a barrier driver 52. The barrier driver 52 may generate a plurality of barrier driving signals CB and may transfer them to the barrier unit 142 to control the plurality of regions R1 to R4.

The scan lines S1 to Sn may be located parallel with the horizontal direction of the display unit 121. The data lines D1 to Dm may be located in parallel with the vertical direction of the display unit 121. Therefore, the scan direction, which sequentially applies the selection signals to the scan lines S1 to Sn, becomes the vertical direction of the display unit 121.

In this case, since the display unit 121 displays the images along the scan direction, when the left and right images are displayed for the first period T1 and then the right and left images are displayed, the left and right images and the right and left images may be mixed on the display unit 121. Therefore, the barrier unit 142 according to the present exemplary embodiment is divided into the plurality of regions R1 to R4 along the scan direction, and each region may be operated in synchronization with the images that are sequentially changed along the scan direction.

Figure 14:
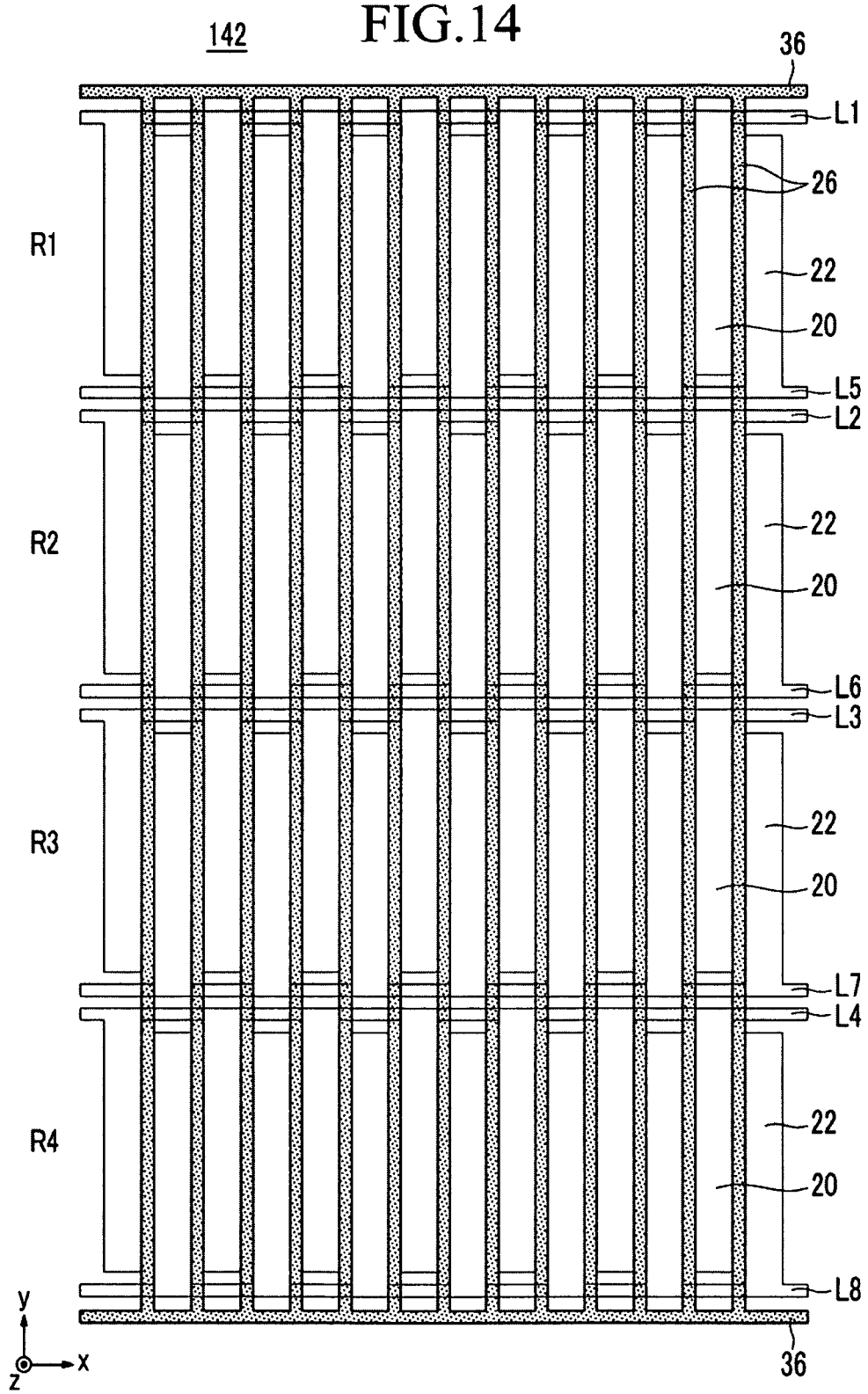
FIG. 14 illustrates a top plan view of auxiliary electrodes of the barrier unit among the electronic display devices according to a third exemplary embodiment.

To this end, as described above, the first electrodes 20 and the second electrodes 22 are separately provided in the plurality of regions R1 to R4. Further, as shown in FIG. 14, the auxiliary electrodes 26 are located corresponding to the first gap between the first electrodes 20 and the second electrodes 22 throughout the barrier unit 142 regardless of the regions. When displaying stereoscopic images, the liquid crystal driving voltage may always be applied to the auxiliary electrodes 26.

FIGS. 12 and 14 show the case where the barrier unit 142 is divided into four regions R1 to R4. However, the number of regions of the barrier unit 142 is not limited to the example shown.

Figure 15:
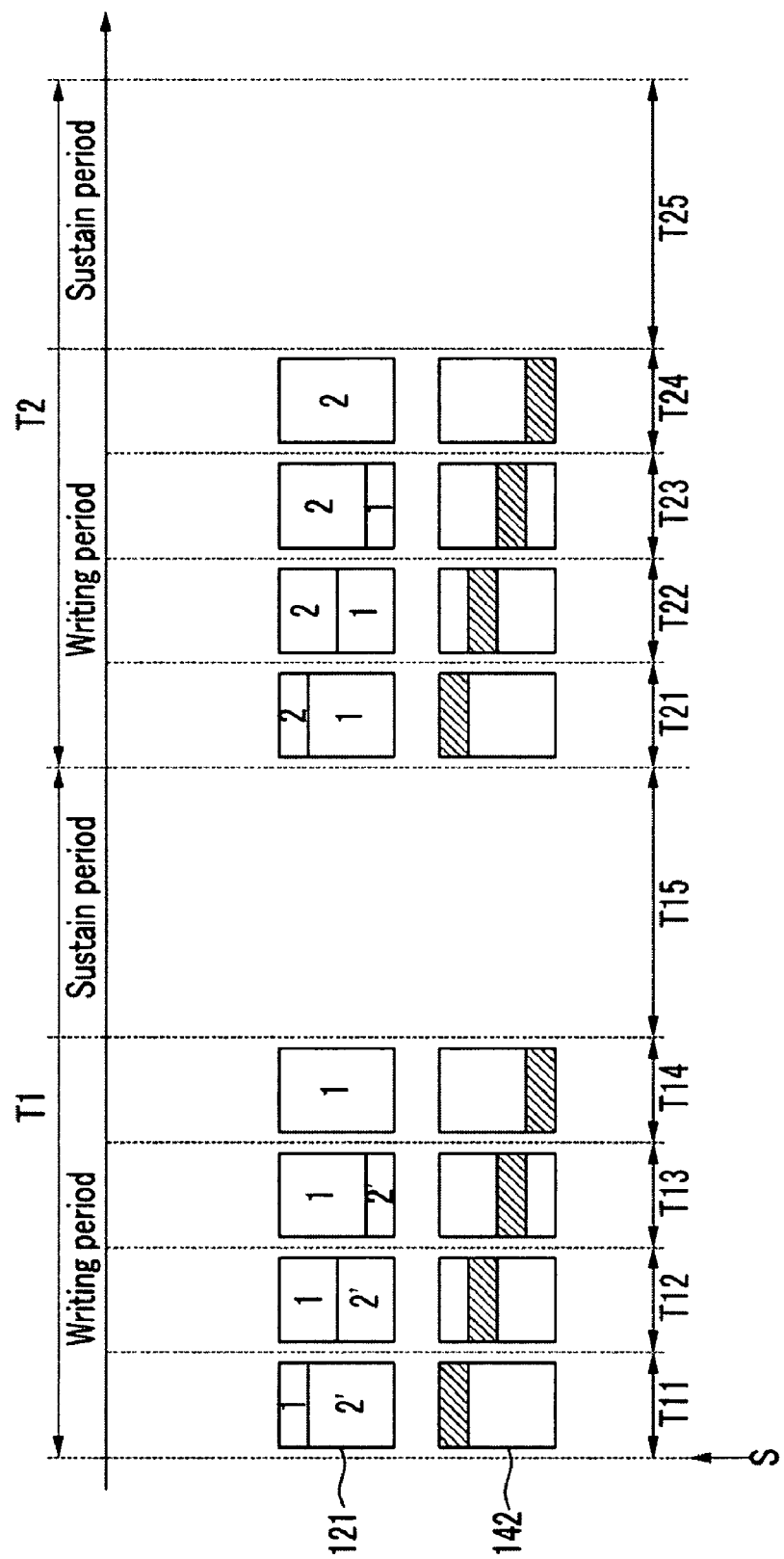
FIG. 15 illustrates a diagram of a process where left and right images are displayed for the first period and right and left images are displayed for the second period, on the display unit according to the third exemplary embodiment.

Hereinafter, an operation of the electronic display device according to a third exemplary embodiment will be described with reference to FIGS. 15 and 16. FIG. 15 illustrates a diagram showing a process where the left and right images 1 are displayed on the display unit 121 for the first period T1 and the right and left images 2 are displayed thereon for the second period T2. FIG. 15 illustrates a state where the images are displayed in each region of the display unit 121 over time and the barrier unit 142 is operated in synchronization therewith. FIG. 16 illustrates a diagram showing the barrier driving signals (CB) transferred from the barrier driver 52 to the plurality of wire units L1 to L8 in the electronic display device according to the third exemplary embodiment.

The first to fourth wire units L1 to L4 are respectively applied with four barrier driving signals CB11 to CB14, and the fifth to eighth wire units L5 to L8 are respectively applied with four barrier driving signals CB21 to CB24. The barrier driving signals CB11 to CB14 and CB21 to CB 24 that are applied to the first to eighth wire units L1 to L8 alternately have the liquid crystal driving voltage V1 and the common voltage Vcom.

Writing periods T11 to T14 and T21 to T24 are periods during which new images are applied to the display unit 121. If the plurality of selection signals are sequentially applied to the scan lines S1 to Sn of the display unit 121, the plurality of data signals are written to the pixels along the data lines D1 to Dm. Sustain periods T15 and T25 are periods that sustain the images for a predetermined period according to the written data signals.

First, the right and left images 2' of the frame immediately before the current frame are displayed on the entire screen immediately before a point in time when the left and right images 1' starts to display. At the present time, if the left and right images 1 of the frame start to write into the display unit 121, the left and right images 1 start to display along the scan direction of the display unit 121. Hereinafter, for convenience of explanation, the overall time required to change from the right and left images 2' to the left and right images 1 is set to be 1.

In the present exemplary embodiment, the barrier unit 142 is divided into four regions R1 to R4, and the display unit 121 is also divided into four regions R1 to R4. The writing periods T11 to T14 and T21 to T24 are assumed to be equal, so each writing period has a duration of 1/4.

Each of the barrier driving signals CB11 to CB14 and CB21 to CB24 having the level of the liquid crystal driving voltage V1 is applied to the first to fourth wire units L1 to L4 and the fifth to eighth wire units L5 to L8 in synchronization with a point in time when any one of the plurality of selection signals is transferred to each region of the display unit 121. The liquid crystal driving voltage V1 is sequentially applied to the first to fourth wire units L1 to L4 corresponding to the left and right images 1 of the current frame for the first period T1. The liquid crystal driving voltage V1 is sequentially applied to the fifth to eighth wire units L5 to L8 corresponding to the right and left images 2 of the current frame for the second period T2. However, the common voltage Vcom is applied to the first to fourth wire units L1 to L4 and the fifth to eighth wire units L5 to L8 corresponding to a region where the right and left images 2 and the left and right images 1 are mixed, thereby optically forming the light shielding unit.

First, during the period T11, after starting to change from the right and left images 2' to the left and right images 1, the left and right images 1 are displayed in the region R1 of the display unit 121, and the right and left images 2' remain in the regions R2 to R4. At this time, the left and right images 1 and the right and left images 2' are mixed in the region R1 before the left and right images 1 are displayed throughout the region R1, i.e., for the entire period T11. Therefore, since the image of the current frame and the image of the frame just before the current frame are mixed, the image quality is deteriorated.

To prevent this, the barrier driving signals CB11 and CB21 become the liquid crystal driving voltage V1 such that the liquid crystal driving voltage V1 is applied to the first wire unit L1 and the fifth wire unit L5. Therefore, the image on the region R1 of the display unit 121 is blocked.

Further, the barrier driving signals CB22, CB23, and CB24 are the liquid crystal driving voltage V1 and the barrier driving signals CB12, CB13, and CB14 are the common voltage Vcom, such that the right and left images 2' stereoscopic images are displayed as in the remaining regions R2, R3, and R4 of the display unit 121.

During the period T12, the left and right images 1 are displayed in the region R1 and the region R2 of the display unit 121 along the scan direction, and the right and left images 2' remain in the region R3 and the region R4. At this time, the left and right images 1 and the right and left images 2' are mixed in the region R2 of the display unit 121, the barrier driving signals CB12 and CB22 become the liquid crystal driving voltage V1 such that the liquid crystal driving voltage V1 is applied to the second wire unit L2 and the sixth wire unit L6. Therefore, the image on the region R2 of the display unit is blocked.

Further, the barrier driving signals CB11, CB23, and CB24 are the liquid crystal driving voltage V1 and the barrier driving signals CB21, CB13, and CB14 are the common voltage Vcom, such that the left and right images 1 are displayed as the stereoscopic images in the region R1 of the display unit 121, and the left and right images 2' are displayed as the stereoscopic images in the region R3 and the region R4.

During a period T13, the left and right images 1 are displayed in the regions R1 to R3 of the display unit 121, and the right and left images 2' remain in the region R4. The barrier driving signals CB13 and CB23 become the liquid crystal driving voltage V1 for this period T13, such that the liquid crystal driving voltage V1 is applied to the third wire unit L3 and the seventh wire unit L7. Therefore, the image on the 3/4 region R3 of the display unit is blocked.

In addition, the barrier driving signals CB11, CB12, and CB24 are the liquid crystal driving voltage V1 and the barrier driving signals CB21, CB22, and CB14 are the common voltage Vcom, such that the left and right images 1 are displayed as the stereoscopic images in the regions R1 and R2 of the display unit 121, and the left and right images 2' are displayed as the stereoscopic images in the region R4.

During a period T14, the left and right images 1 are displayed in the entire region of the display unit 121. The barrier driving signals CB14 and CB24 become the liquid crystal driving voltage V1 for this period T14, such that the liquid crystal driving voltage V1 is applied to the fourth wire unit L4 and the eighth wire unit L8. Therefore, the image on the region R4 of the display unit is blocked.

Further, the barrier driving signals CB11, CB12, and CB13 are the liquid crystal driving voltage V1 and the barrier driving signals CB21, CB22, and CB23 become the common voltage Vcom, such that the left and right images 1 are displayed as the stereoscopic images in the regions R1 to R3 of the display unit 121.

The next period is the sustain period T15, and the left and right images 1 are displayed in the entire region of the display unit 121 and are sustained for a predetermined period. At this time, the barrier driving signals CB11 to CB14 are the liquid crystal driving voltage V1 and the barrier driving signals CB21 to CB24 are the common voltage Vcom. Therefore, the left and right images 1 are displayed as the stereoscopic images in the entire region of the display unit 121.

Next, the operation for the second period T2 will be described.

During the period T21, after starting to change from the left and right images 1 to the right and left images 2, the right and left images 2 are displayed in the region R1 of the display unit 121, and the left and right images 1 remain in the remaining regions R2 to R4. The barrier driving signals CB11 and CB21 become the liquid crystal driving voltage V1 for this period T21, such that the liquid crystal driving voltage V1 is applied to the first wire unit L1 and the fifth wire unit L5. Thereby, the image on the region R1 of the display unit is blocked.

Further, the barrier driving signals CB12, CB13, and CB14 are the liquid crystal driving voltage V1 and the barrier driving signals CB22, CB23, and CB24 become the common voltage Vcom, such that the left and right images 1' are displayed as the stereoscopic images in the remaining regions R2 to R4 of the display unit 121.

During the period T22, the right and left images 2 are displayed in the region R1 and the region R2 of the display unit 121, and the left and right images 1 remain in the region R3 and the region R4. The barrier driving signals CB12 and CB22 become the liquid crystal driving voltage V1 for this period T22, such that the liquid crystal driving voltage V1 is applied to the second wire unit L2 and the sixth wire unit L6. Therefore, the image on the region R2 of the display unit is blocked.

In addition, barrier driving signals CB21, CB13, and CB14 are the liquid crystal driving voltage V1 and the barrier driving signals CB11, CB23, and CB24 become the common voltage Vcom, such that the right and left images 2 are displayed as the stereoscopic images in the region R1 of the display unit 121 and the left and right images 1 are displayed as the stereoscopic images in the region R3 and the region R4.

During the period T23, the right and left images 2 are displayed in the regions R1 to R3 of the display unit 121, and the left and right images 1 remain in the region R4. The barrier driving signals CB13 and CB23 become the liquid crystal driving voltage V1 for this period T23, such that the liquid crystal driving voltage V1 is applied to the third wire unit L3 and the seventh wire unit L7. Therefore, the image on the region R3 of the display unit is blocked.

Further, barrier driving signals CB21, CB22, and CB14 are the liquid crystal driving voltage V1 and the barrier driving signals CB11, CB12, and CB24 become the common voltage Vcom, such that the right and left images 2 are displayed as the stereoscopic images in the region R1 and the region R2 of the display unit 121, and the left and right images 1 are displayed as the stereoscopic images in the region R4.

During the period T24, the right and left images 2 are displayed in the entire region of the display unit 121. The barrier driving signals CB14 and CB24 become the liquid crystal driving voltage V1 for this period T24, such that the liquid crystal driving voltage V1 is applied to the fourth wire unit L4 and the eighth wire unit L8. Therefore, the image on the region R4 of the display unit is blocked.

Further, the barrier driving signals CB21, CB22, and CB23 are the liquid crystal driving voltage V1 and the barrier driving signals CB11, CB12, and CB13 become the common voltage Vcom, such that the right and left images 2 are displayed as the stereoscopic images in the regions R1 to R3 of the display unit 121.

The next period is the sustain period T25, and the right and left images 2 are displayed in the entire region of the display unit 121 and sustained for a predetermined period. At this time, the barrier driving signals CB21 to CB24 become the liquid crystal driving voltage V1 and the barrier driving signals CB11 to CB24 are the common voltage Vcom. Therefore, the right and left images 2 are displayed as the stereoscopic images in the all regions R1 to R4 of the display unit 121.

The electronic display device according to embodiments can prevent light from leaking from the barrier unit when displaying the stereoscopic images. As a result, the electronic display device according to embodiments suppresses crosstalk, thereby making it possible to increase the stereoscopic image quality and the contrast of the screen. Further, the electronic image quality according to the embodiments does not cause luminance deterioration of the screen when displaying the two-dimensional images, making it possible to implement the high-luminance screen.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electronic display device, comprising:
   a display unit that displays images;
   a barrier unit, between the display unit and a viewer, the barrier unit configured to interchangeably provide images to a user as one of two-dimensional images and stereoscopic images through at least one of a light transmitting unit and a light shielding unit, wherein the barrier unit includes:
   first electrodes and second electrodes alternately arranged on a first surface, the first electrodes being spaced apart from adjacent ones of the second electrodes by first gaps;
   auxiliary electrodes on a second surface, the auxiliary electrodes corresponding to the first gaps, respectively, and the auxiliary electrodes being configured to be driven in synchronization with each of the two-dimensional images and the stereoscopic images such that when the auxiliary electrodes are driven in synchronization with the stereoscopic images one light shielding unit corresponds to areas including two adjacent auxiliary electrodes and an entirety of an area between the two adjacent auxiliary electrodes;
   a common electrode on a third surface; and
   a liquid crystal layer between the common electrode and the first, second, and auxiliary electrodes; and
   a barrier driver configured to control the barrier unit in accordance with whether two-dimensional images or stereoscopic images are to be displayed.

2. The electronic display device as claimed in, claim 1, wherein:
   the second surface is a transparent insulation layer covering the first electrodes and the second electrodes; and
   the auxiliary electrodes are on the transparent insulation layer.

3. The electronic display device as claimed in claim 2, wherein the barrier unit further includes:
   a first alignment layer on the transparent insulation layer and covering the auxiliary electrodes; and
   a second alignment layer on the common electrode.

4. The electronic display device as claimed in claim 1, wherein:
   the first surface is a transparent insulating layer covering the auxiliary electrodes; and
   the first and second electrodes are on the transparent insulating layer.

5. The electronic display device as claimed in claim 4, wherein the barrier unit further includes:
   a first alignment layer on the transparent insulation layer and covering the first electrodes and the second electrodes; and
   a second alignment layer on the common electrode.

6. The electronic display device as claimed in claim 1, wherein a width of each of the auxiliary electrodes is larger than the first gap.

7. The electronic display device as claimed in claim 1, wherein the barrier unit further includes:
   a first connecting part that electrically connects the first electrodes;
   a second connecting part that electrically connects the second electrodes; and
   a third connecting part that electrically connects the auxiliary electrodes.

8. The electronic display device as claimed in claim 1, wherein the barrier unit further includes:
   a first polarizing plate below the first and second surfaces; and
   a second polarizing plate above the third surface, the polarizing axes of the first and second polarizing plates being orthogonal.

9. The electronic display device as claimed in claim 8, wherein, when the display unit displays the two-dimensional images, the barrier driver supplies a common voltage to the first electrodes, the second electrodes, the auxiliary electrodes, and the common electrode.

10. The electronic display device as claimed in claim 8, wherein, when the display unit displays stereoscopic images:

the display unit is configured to divide one frame into a first period and a second period, and display first images for the first period and second images for the second period; and the barrier driver is configured to apply a liquid crystal driving voltage to the first electrodes and the auxiliary electrodes during the first period, and apply the liquid crystal driving voltage to the second electrodes and the auxiliary electrodes during the second period.

11. The electronic display device as claimed in claim 10, wherein the first images are generated by synthesizing left-eye images and right-eye images according to an order from the left eye to the right eye and the second images are generated by synthesizing the left-eye images and the right-eye images according to an order from the right eye to the left eye.

12. The electronic display device as claimed in claim 1, wherein the display unit includes:
   a plurality of scan lines that transfer a plurality of selection signals;
   a plurality of data lines that transfer a plurality of data signals; and
   a plurality of pixels connected to the scan lines and the data lines, the barrier unit including a plurality of regions divided along a scan direction of the display unit, first and second electrodes being provided to each of the plurality of regions.

13. The electronic display device as claimed in claim 12, wherein:
   the display unit is configured to divide one frame into a first period and a second period, and display first images for the first period and second images for the second period by driving the first electrodes in accordance with the first images and the second electrodes in accordance with the second images; and
   the barrier driver is configured to control a region, among the plurality of regions, corresponding to a mixing region where the first images and the second images are mixed to be a non-transmitting region.

14. The electronic display device as claimed in claim 13, wherein the first images are displayed along a scan direction for the first period and the second images are displayed along a scan direction for the second period, and the mixing region is a region where the first image and the second image are mixed while displaying the first image and then the second image.

15. The electronic display device as claimed in claim 13, wherein the first images are generated by synthesizing the left-eye images and the right-eye images according to an order from the left eye to the right eye and the second images are generated by synthesizing the left-eye images and the right-eye images according to an order from the right eye to the left eye.

16. The electronic display device as claimed in claim 13, wherein the barrier driver is configured to apply the liquid crystal driving voltage to the auxiliary electrodes during the first and second periods.

17. A barrier system for use with a display unit, comprising:
   a barrier unit to be positioned between the display unit and a viewer, the barrier unit configured to interchangeably provide images to a user as one of two-dimensional images and stereoscopic images through at least one of a light-transmitting unit and a light shielding unit, wherein the barrier unit includes:
      first electrodes and second electrodes alternately arranged on a first surface, the first electrodes being spaced from adjacent ones of the second electrodes by first gaps;
      auxiliary electrodes on a second surface, the auxiliary electrodes corresponding to the first gaps, respectively, and the auxiliary electrodes being configured to be driven in synchronization with each of the two-dimensional images and the stereoscopic images such that when the auxiliary electrodes are driven in synchronization with the stereoscopic images one light shielding unit corresponds to areas including two adjacent auxiliary electrodes and an entirety of an area between the two adjacent auxiliary electrodes;
      a common electrode on a third surface; and
      a liquid crystal layer between the common electrode and the first, second, and auxiliary electrodes; and
   a barrier driver configured to control the barrier unit in accordance with whether two-dimensional images or stereoscopic images are to be displayed.

18. The electronic display device as claimed in claim 1, wherein the one light shielding unit is one continuous region defined by the areas including the two adjacent auxiliary electrodes and the entirety of the area between the two adjacent auxiliary electrodes, the entirety of the area between the two adjacent auxiliary electrodes corresponding to a distance by which the two adjacent auxiliary electrodes are spaced apart from each other.

19. The electronic display device as claimed in claim 1, wherein:
   when the auxiliary electrodes are driven in synchronization with the two-dimensional images, a single light transmitting unit corresponds to a region including all of the auxiliary electrodes and an entirety of regions extending between all of the auxiliary electrodes, and
   when the auxiliary electrodes are driven in synchronization with the stereoscopic images during a first period and a second period,
   at the first period a first light shielding unit corresponds to a first area having first and second adjacent auxiliary electrodes of the auxiliary electrodes and one of the first electrodes therein, and a second area adjacent to the first area corresponds to one light transmitting unit, the second area overlapping one of the second electrodes adjacent to the one of the first electrodes, and
   at the second period a second light shielding unit corresponds to a third area having the second area and the second auxiliary electrode therein, the third area further having a third auxiliary electrode adjacent to the second auxiliary electrode therein.

20. The electronic display device as claimed in claim 1, wherein:
   the barrier unit is configured to provide the stereoscopic images to the user through a plurality of the one light shielding unit each having a first width and a plurality of the light transmitting unit each having a second width, the first width being greater than the second width,
   a width of the first electrodes is substantially equal to a width of the second electrodes, and a width of the auxiliary electrodes is substantially equal to or larger than a width of the first gaps, and
   the first width is defined by the width of two of the auxiliary electrodes and the width of one of the first and second electrodes.

* * * * *